United States Patent

Phillips

[15] 3,659,142

[45] Apr. 25, 1972

[54] ANNULAR SCANSION CIRCUIT FOR CLOSED CIRCUIT TELEVISION SYSTEMS

[72] Inventor: Edwin N. Phillips, Winter Park, Fla.

[73] Assignee: The United States of America as represented by the Secretary of the Navy

[22] Filed: Oct. 26, 1970

[21] Appl. No.: 84,032

[52] U.S. Cl. ....................315/24, 178/DIG. 1

[51] Int. Cl. ....................H01j 29/78

[58] Field of Search ....................315/18, 19, 24

[56] References Cited

UNITED STATES PATENTS

| | | | |
|---|---|---|---|
| 2,995,678 | 8/1961 | Taylor et al. | 315/24 |
| 3,440,480 | 4/1969 | Henderson | 315/18 |

*Primary Examiner*—Reuben Epstein

*Attorney*—Richard S. Sciascia and John W. Pease

[57] ABSTRACT

A circuit of high and low frequency quadrature networks and additive amplifiers for generating an annular scansion pattern in a CRT employed in a closed circuit television system; the scan pattern being generated by combining alternate quadrature components of two voltages of different frequencies for application to the horizontal and vertical deflection plates of the CRT, the scan pattern being characteristic of a spring coil bent along the path of a base frame frequency circle.

6 Claims, 5 Drawing Figures

Patented April 25, 1972 3,659,142

4 Sheets-Sheet 1

Edwin N. Phillips
INVENTOR

By John M. Pease
Attorney

Edwin N. Phillips
INVENTOR

By John M. Pease
Attorney

Patented April 25, 1972

3,659,142

4 Sheets-Sheet 3

Edwin N. Phillips
INVENTOR

By John M. Pease
Attorney

Edwin N. Phillips
INVENTOR

By [signature]

Attorney

ANNULAR SCANSION CIRCUIT FOR CLOSED CIRCUIT TELEVISION SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The subject invention is specifically designed for scan of a 360° field of view, as for example the view as seen from a submarine periscope. Another example is where an outside panoramic scene is reflected by a quasi-spherical optical reflector onto the target of a vidicon television transducer tube, and the electrical wave train is transmitted via suitable cable to a television projection system located concentrically within a right cylinder viewing screen. The transduction of the wave trains into an optical image via the projection transducer allow the re-projection against a second similar quasi-spherical optical reflector. The resultant right cylinder projection on the viewing screen is the visual image of the object scene surveyed continually by the receiving camera at some remote location to produce a 360° annular scene.

In the past attempts to scan such circular fields of view as exemplified above have involved mechanical means for rotation of an element or elements to provide the frame circle scan. This approach has been unsatisfactory because of the limited speed of field frame scan. Prior art methods have also been unsatisfactory in not providing 100 percent area of scan. The use of various forms of cycloidal motion of the synchronized scanning beams in a vidicon camera and in the receiving monitor where such are mathematical forms, such as the cycloid, the hypercycloid, the epicycloid and the like have also been found unsatisfactory.

SUMMARY OF THE INVENTION

In the subject invention, in order to completely scan the annular area, a rolling circle scansion circuit is provided to produce a small substantially circular rotation between inner and outer defining circles of an annulus whose center, in turn, is forced to travel along a larger circle with a frame lying half way between these circle limits. The small circle (line scan) is made to travel many times as fast as the larger circle (frame scan) and the larger circle (frame scan) is made to travel fast enough so that the image is replenished before the eye can detect decay. Because of the constant movement of the small-circle (line scan) center on the larger-circle (frame scan) periphery with time, no trace is perfectly circular. The contiguous connected frame is that of a spring coil bent along the larger-circle path. Such a frame is obtained by a circuit of relatively high and low frequency voltage sources with quadrature voltage forming networks and additive amplifiers and will sweep out a pattern which will explore every spot within the annulus, providing enough revolutions of the scanning smaller circle are provided. The scanning pattern is made to appear stationary by selecting the speed of scansion of the larger circle to exceed flicker frequency.

DESCRIPTION OF THE PREFERRED EMBODIMENTS

Figure 2:
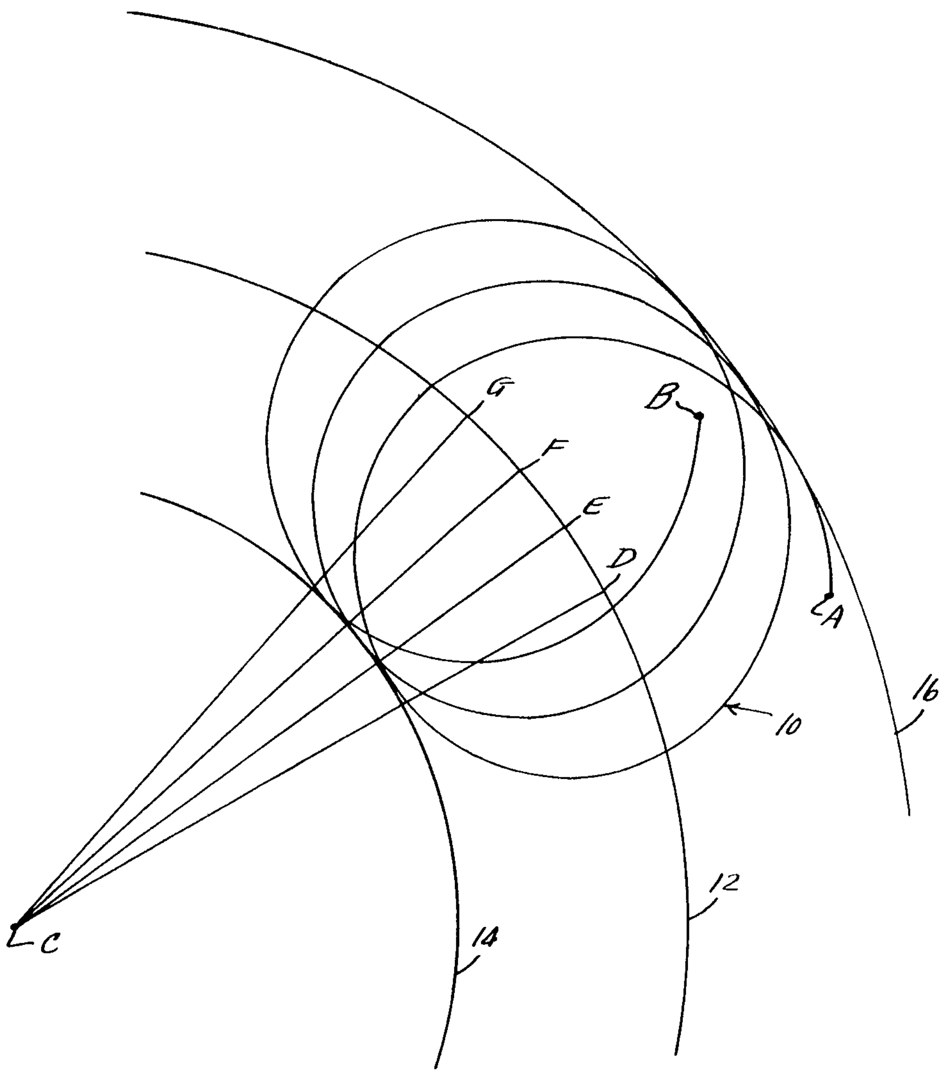

Referring initially to FIG. 2 of the drawing there is shown in a point to point plot the pattern of a rolling circle scan to which apparatus of the subject invention is directed. In the plot the curve, generally indicated at 10, beginning at A and ending at B after three revolutions, represents the line scan pattern. The great circle curve, generally indicated at 12, represents the frame scan trace. The line scan is bounded, as indicated, by a small inner circle 14 and a larger outer circle 16 which represent the perimeters of the annular area being scanned. The center of the circles 14 and 16 and of the trace 12 is indicated at C. The center of evolution of the successive loops of the line scan 10 are continuously, progressively moving as indicated by the points D, E, F and G on the frame scan trace 12. Because of the constant movement of the centers of evolution of the line scan pattern 10 on the frame scan trace 12, no line scan pattern is perfectly circular. Instead, the contiguous connected trace is that of a spring coil bent along the frame scan trace 12. However, such line scan trace will sweep out a pattern which will explore every spot within the annulus, providing enough revolutions of the line scan are made and this scanning pattern will appear stationary if the speed of scansion of the frame scan exceeds the flicker frequency, i.e. each frame scan must be made in the area of one forty-eighth of a second or less.

Figure 3:
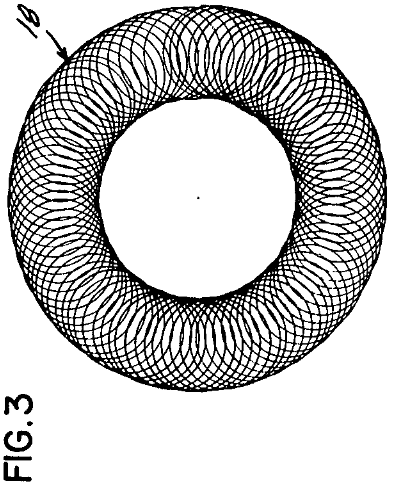
FIGS. 2 and 3 illustrate typical rolling circle scansions produced by the circuit of FIG. 1.

Referring to FIG. 3 there is shown a scan pattern 18 of the type described above wherein the ratio of $r$, the ratio of scan of the line scan, to R, the ratio of scan of the frame scan is equal to 0.333. It is to be understood that the area of annular scan can be adjusted by selection of the ratio of $\gamma$/R. Increasing the ratio toward unity decreases the unscanned central area and conversely.

Having described the form of scan which is the object of the invention to provide a more complete and effective scan than has been available with prior art approaches, suitable circuitry for accomplishing the desired result will now be described.

Figure 1:
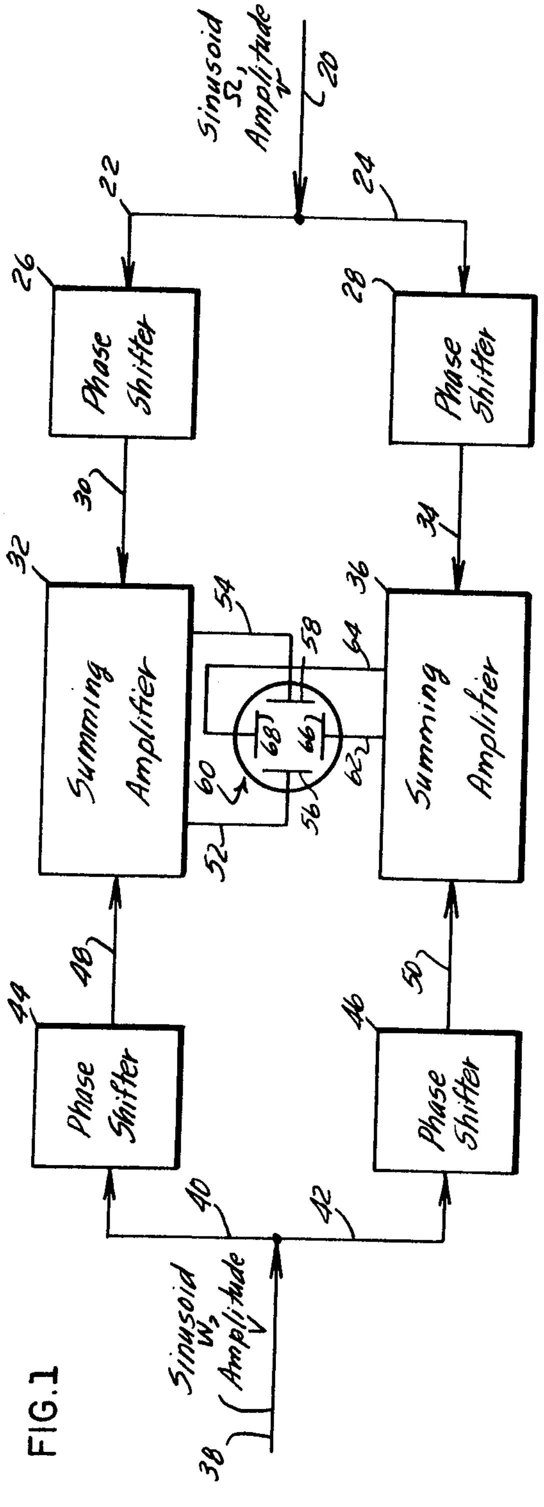
FIG. 1 is a block diagram of a suitable quadrature voltage forming network amplifying circuit shown connected to the beam deflection plates of a CRT and incorporating the invention.

Referring to FIG. 1 there is shown therein in simplified block diagram a rolling circle scansion generator incorporating the invention as applied to one set of beam deflection plates of a CRT. Thus, as shown at the right side of FIG. 1 a source of sinusoidal wave form of frequency $\Omega$ and amplitude $v$ is indicated by the arrow 20. This corresponds to line scan frequency and is fed on lines 22 and 24 to respective positive 45° phase shifter 26 and negative 45° phase shifter 28. The output of phase shifter 26 is fed on a line 30 to an additive summing amplifier 32 and the output of phase shifter 28 is fed on a line 34 to summing amplifier 36. The inputs to the two summing amplifiers are thus 90° out of phase. In the same manner a sinusoidal wave source indicated by the arrow 38 is connected through lines 40 and 42 and positive and negative 45° phase shifters 44 and 46 and by lines 48 and 50 to the respective summing amplifiers 32 and 36. The sinusoidal wave source 38 is of frame frequency $\omega$ and amplitude V and corresponds to frame frequency scan. The additive output of summing amplifier 32 are connected on lines 52 and 54 to deflection plates 56 and 58 of the CRT 60 and the additive output of the summing amplifier 36 is passed on lines 62 and 64 to the plates 66 and 68 of the CRT 60.

In this manner a rolling circle pattern of scan as exemplified in FIG. 3 is produced on the CRT.

Figure 4:
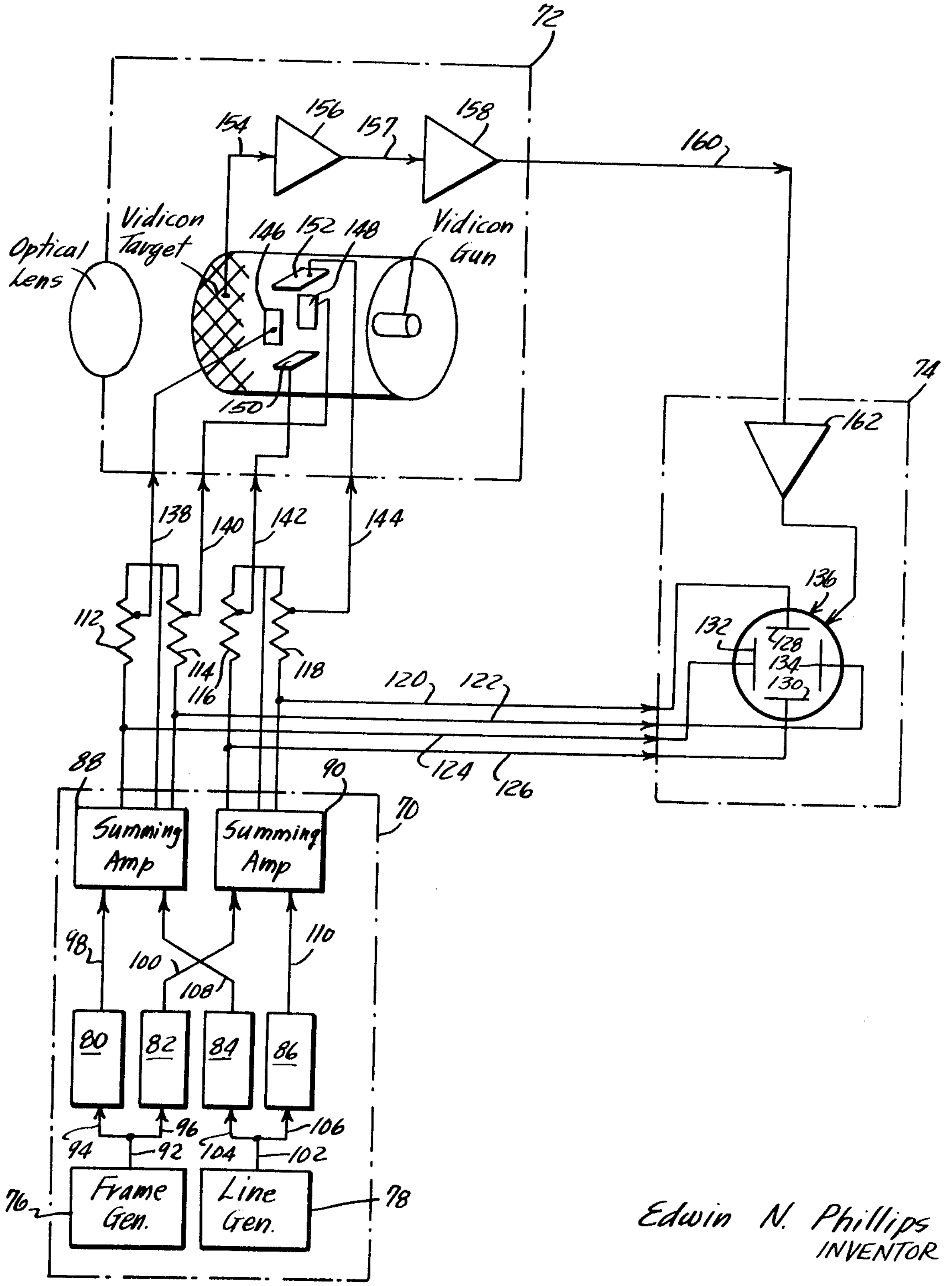
FIG. 4 illustrates one version of a rolling circle scansion generator utilizing independent frame and line generators and incorporated in a closed circuit television system.

In FIG. 4 is shown one form of rolling circle scansion generator, indicated generally by the dotted outline 70, shown connected to serve a video camera 72 and a monitor receiver 74.

In the arrangement as shown in FIG. 4 the scansion generator 70 includes separate frame and line generators indicated respectively at 76 and 78. A phase splitter arrangement of phase shifters 80, 82, 84 and 86 and additive amplifiers 88 and 90 are connected as indicated to provide the required rolling circle scansion. Thus, frame generator 76, operating at frequency ω is connected by lines 92, 94 and 96 to respective phase shifters 80 and 82 which in turn are cross-coupled by lines 98 and 100 to respective amplifiers 88 and 90. Line generator 78, operating at line scan frequency Ω is connected by lines 102, 104 and 106 to respective phase shifters 84 and 86 which are cross-coupled by lines 108 and 110 to respective amplifiers 88 and 90.

In a closed circuit television system there is no reason why the same voltage pairs cannot supply both the camera and the receiver monitor. That is, the major differences between the comparable voltages are amplitudes only, the larger voltages actuating the receiver monitor and the smaller voltages activating the camera. Hence, a set of potentiometers 112, 114, 116 and 118 are provided to perform this function.

The higher full voltages from the summing amplifiers are passed on lines 120, 122, 124 and 126 to the respective beam deflection plates 128, 130, 132 and 134 of the CRT 136 of the receiver monitor 74. The smaller potentiometer reduced voltages are passed on lines 138, 140, 142 and 144 to the respective plates 146, 148, 150 and 152 of the camera 72.

The camera 72 is connected to the receiver monitor in conventional manner via line 154, pre-amplifier 156, line 157, post amplifier 158, line 160 and video amplifier 162 of the monitor 74.

Figure 5:
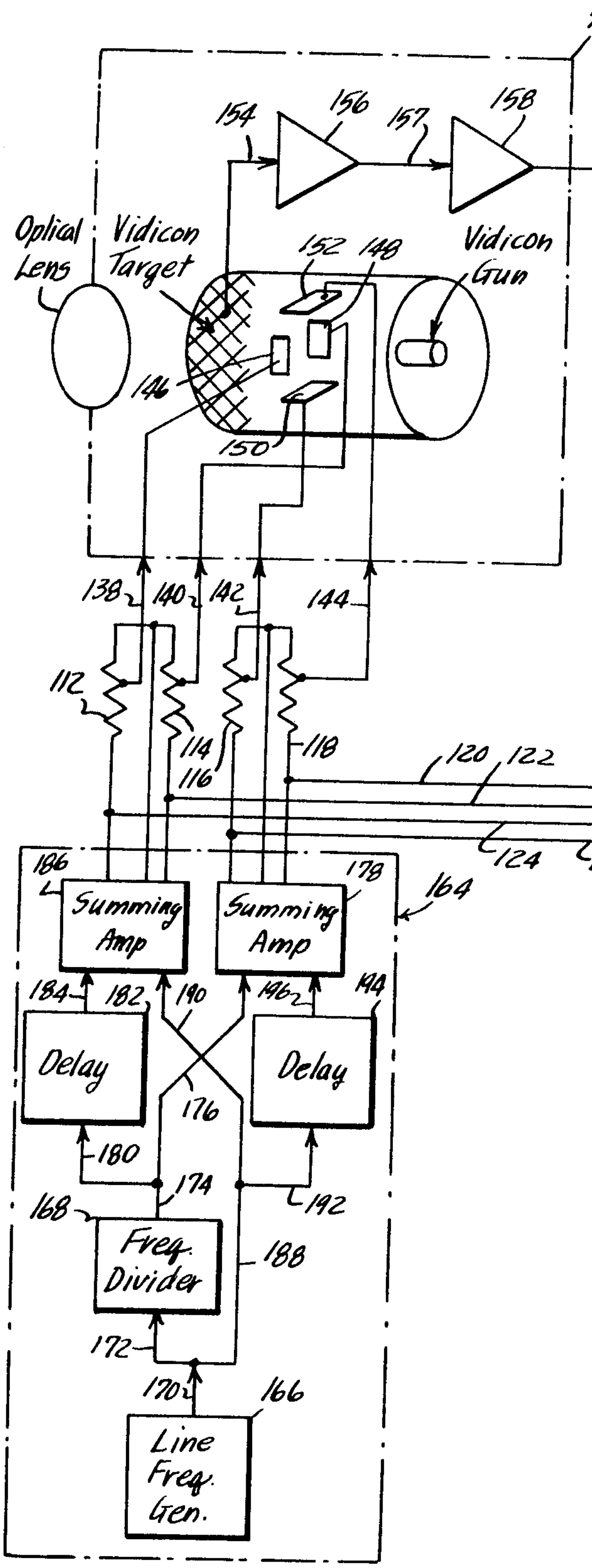
FIG. 5 illustrates a variant of FIG. 4 in which a line frequency generator and frequency divider circuit are employed in the scansion generator in place of the two independent generator sources of FIG. 3.

In the above described arrangement separate frame and line generators were employed to provide the two different frequencies required. In FIG. 5 is shown a modification of the invention applied in a closed circuit television system, the difference residing in the provision of a rolling circle scansion generator 164 employing only a single frequency generator, i.e. a line frequency scan generator 166 operating at line frequency Ω and a frequency divider circuit 168 for providing the frame scan frequency ω. Thus, line frequency generator 166 is connected by lines 170 and 172 to frequency divider 168 to obtain an output of frame scan frequency ω. The output of divider 168 is passed on lines 174 and 176 to a summing amplifier 178. The output of divider 168 is also passed on lines 174 and 180 through a 90° delay circuit 182 to obtain the necessary quadrature voltage and thence on line 184 to a second summing amplifier 186. The output of line frequency generator 168 is passed on lines 170, 188 and 190 to summing amplifier 186 and on lines 170, 188 and 192 through a 90° delay circuit 194 to provide a quadrature voltage and thence on line 196 to the summing amplifier 178. The resultant arrangement provides a cross-coupled quadrature voltage arrangement with the summing amplifiers 186 and 178 to provide the necessary sine and cosine outputs for development of circular scan.

The remainder of the closed circuit television system of FIG. 5 is identical with that described in relation to FIG. 4. Hence, the same numerals are applied to the remaining elements and repetition of the description is omitted.

OPERATION

In operation of the arrangement shown in FIG. 4 employing two sinusoidal generators 76 and 78 the lower frame frequency ω supplied by generator 76 may correspond to a 30 frame per second framing frequency at a 2 to 1 interlace ratio. The higher line scan frequency Ω is supplied by line generator 78 and may be about 15,000 cycles per second or more. In usual 4/3 aspect ratio scansions employed in domestic broadcast television, the line frequency would be 525 lines per field multiplied by 30 fields per second, or 15,750 cycles per second. Since this is the raster type used in the experimental equipment which verified the working principle set out in this patent disclosure, 15,000 cps. is entirely satisfactory. Should it be desired that a higher raster density be preferred, say 1,029 lines per picture height, then a higher line frequency would be chosen to obtain equal comparison between the usual rectangular scansion pattern and this rolling circle annular scansion pattern. This would be 1,029 lines per picture height multiplied by 30 fields per second or 30,870 cps.

Since two voltages must be in quadrature to generate a circular trace on the face of a cathode ray tube when connected to the two sets of deflection plates, phase shifters 80, 82, 84 and 86 are fed by the two generators 76 and 78. Further, since phase shifting circuits cannot shift relative phase by 90° as needed, a phase lead network and a phase lag network are fed by each voltage pair as indicated. In this way, the two voltages leading by 45° and lagging by 45° give the necessary quadrature phase relationship for circle generation.

It is in the two summing amplifiers 88 and 90 that the voltage additions, at the two different frequencies for each of the two summing amplifiers, are combined to produce the necessary voltage outputs to produce the rolling circle trace. The full voltages are applied via lines 120, 122, 124 and 126 to the monitor receiver deflection plates 128, 130, 132 and 134, and the divided voltages are applied via lines 138, 140, 142 and 144 to the camera deflection plates 146, 148, 150 and 152.

In the modification of FIG. 5 operation is the same except that a single line frequency generator 166 and a frequency divider 168 are provided to produce the two frequencies desired and two 90 degree delay circuits 182 and 194 are cross-coupled to the summing amplifiers 186 and 178 to provide the necessary quadrature voltage outputs.

An important advantage of the subject invention is that no retrace is either possible or desirable with this scanning system, in contrast to the usual scanning pattern of conventional television; consequently more detail per unit bandwidth is available, and the resolution is correspondingly higher since all the period time is devoted to useful scansion.

Another advantage of the invention is the ability to provide circular traces, the pattern being capable of being enclosed within an outer containing circle and with an inner circle variable to zero-radius so that only the circular images of round optical elements are scanned and nothing is wasted by scansion outside the limiting perimeter.

A further advantage is the ability to select the ratio of line frequency to frame frequency to provide a non-integer, prime numbers being desirable in that there is a continuous non-repeating pattern of sweeping out the scene elements of a given image.

What is claimed is:

1. A circuit for generating annular scansion in a CRT having vertical and horizontal deflection means, the scansion being characterized as a substantially circular scan rolling around a base circle, said circuit comprising:

a. a first source of sinusoidal voltage having a first frequency;

b. a second source of sinusoidal voltage having a second frequency which is higher than said first frequency;

c. a first quadrature voltage forming network operative to split said voltage of said first frequency into first and second voltage components having said first frequency and 90° out of phase with one another;

d. a second quadrature voltage forming network operative to split said voltage of said second frequency into third and fourth components having said second frequency and 90° out of phase with one another;

e. a first cross-coupled summing amplifier means operative to add said first and third components to control horizontal deflection voltage; and f. a second cross-coupled summing amplifier means operative to add said second and fourth components to control the vertical deflection voltage.

2. Apparatus according to claim 1, said first and second quadrature voltage forming networks being of the phase splitter type.

3. Apparatus according to claim 1, including:

a. resistance voltage dividers for applying said annular scansion at different voltage amplitudes respectively to the camera and monitor CRT's of a closed circuit television system.

4. Apparatus according to claim 1, a. said voltage sources being selected such that the ratio of frequency of said second source to the frequency of said first source is a non-integer to provide a non-repeating pattern of sweeping.

5. Apparatus according to claim 2, including:

a. each of said phase splitter networks having two 45° phase shifter channels;

b. said first sinusoidal voltage source comprising a frame frequency generator connected through said first phase splitter network phase shifter channels respectively to said first and second summing amplifier means;

c. said second sinusoidal voltage source comprising a line frequency generator connected through said second phase splitter network phase shifter channels respectively to said first and second summing amplifiers.

6. Apparatus according to claim 1, a. each of said quadrature voltage forming networks comprising a 90° delay channel;

b. said second sinusoidal voltage source comprising a line frequency generator connected to said first summing amplifier means and through one of said delay channels to the second of said summing amplifier means;

said first sinusoidal voltage source comprising a frequency divider receiving output from said line frequency generator and connected to said second summing amplifier and through said other delay channel to said first summing amplifier.

* * * * *